June 8, 1937. F. UNGERER Re. 20,403

ADJUSTABLE SUPPORTING MECHANISM FOR STRAIGHTENING ROLLS OF PLATE STRAIGHTENING MACHINES

Original Filed March 18, 1929 2 Sheets-Sheet 1

Inventor:
Fritz Ungerer
by [illegible]
Attorney

June 8, 1937. F. UNGERER Re. 20,403

ADJUSTABLE SUPPORTING MECHANISM FOR STRAIGHTENING ROLLS OF PLATE STRAIGHTENING MACHINES

Original Filed March 18, 1929 2 Sheets-Sheet 2

Inventor:
Fritz Ungerer
by [illegible]
Attorney

Reissued June 8, 1937 Re. 20,403

UNITED STATES PATENT OFFICE 20,403

ADJUSTABLE SUPPORTING MECHANISM FOR STRAIGHTENING ROLLS OF PLATE STRAIGHTENING MACHINES

Fritz Ungerer, Pforzheim-Protzinger, Germany

Original No. 1,822,119, dated September 8, 1931, Serial No. 348,078, March 18, 1929. Application for reissue October 17, 1936, Serial No. 106,257. In Germany September 19, 1928

4 Claims. (Cl. 153—54)

As is known, the straightening rolls of plate straightening machines are supported on supporting rolls which are adjustably arranged so that they serve simultaneously for deflecting the straightening rolls toward the work. This enables the rolls to press particularly strongly along certain sections of the plate.

If, however, the work is hard, requiring heavy pressures for the straightening, the supporting rolls yield by deflecting at the middle, so that the straightening rolls often lack the necessary support at those points where they should exert the heaviest pressure.

The retrospective forces, acting from the work onto the rolls, can thereby influence the form of the straightening rolls' flexion curve in a manner which cannot be anticipated by the operator of the straightening machine. He also cannot regulate by hand the form of the flexion curve of the straightening rolls, in view of these counterforces, the strength and effect of which cannot be predetermined.

One of the chief causes of mistakes, which occur particularly when straightening hard and thin plates, or sheets, is due to the fact that the form which the straightening rolls adopt, during the straightening operation under the influence of all the acting forces and on which are dependent to a great extent the straightening result, cannot be positively set with the known means. The present invention overcomes these difficulties.

According to the present invention, the adjusting means, which is arranged along the straightening rolls, is designed to deflect the straightening rolls toward the work, thereby permitting the sheet to conform to the deflection curvature assumed by the straightening rolls.

An object of this invention is to provide a plurality of adjustable supporting rollers for straightening rolls of plate straightening machines wherein at least one portion of the supporting roll has a movement relative to the rest of the roll in moving into its supporting positions.

Another object of this invention is to subject a sheet passing through the straightening rollers, of a plate straightening machine, to waves or corrugations of differing transverse amplitude.

These and other advantages which will become apparent as the disclosure proceeds, in which.

Figure 1:
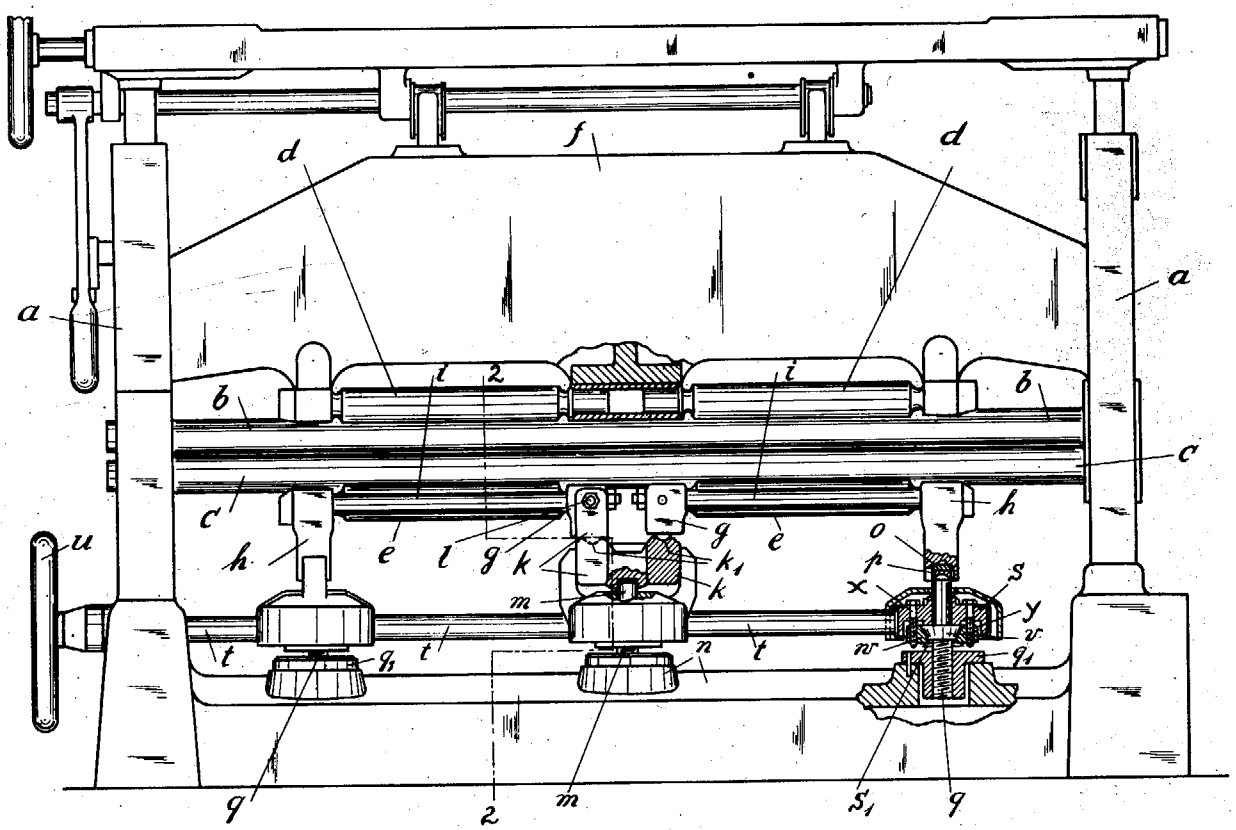
Figure 1 shows in elevation and partly in section a plate straightening machine with adjustable supporting mechanism.

The upper and lower straightening rolls *b* and *c* are journaled in the machine uprights *a*—*a*. Each of the rolls is supported by two rows of supporting rolls *d* and *e*, the upper supporting rolls *d* being mounted, in any conventional manner, in the yoke member *f*, so that they participate in the adjustment movements of this yoke member, whereas the journals of the lower supporting rolls *e* project into bearing bodies *g* and *h*, rigidly connected together in pairs by struts *i* to form each pair a bearing frame belonging to one row of supporting rolls. Two such rigid frames composed of a bearing body *g* and *h* and of two struts *i* are, after the insertion of the corresponding row of supporting rollers *e*, symmetrically arranged under the lower row of rolls *c* so that the inner bearing bodies *g* face each other and the outer bearing bodies *h* are turned away from each other. Each of the inner bearing bodies *g* is supported in a hollow sliding surface $k_1$ of a middle part *k* of the mechanism, so that they perform a slight oscillation, i. e. slightly turn between the points of the end screws *l* around an axis at right angles to the center axis of the supporting rolls for the purpose of inclined adjustment of the supporting rolls *e* corresponding to the desired progress of the flexion curve of the straightening rolls *c*. The middle part *k* rests on the two inner screw spindles *m* capable of rotation as adjusting means in the nuts $m_1$, rigidly fixed on the lower machine frame *n*.

Owing to the rigid connection between the outer bearing bodies *h* and the inner bearing bodies *g*, the former must participate in the swinging movement of the latter around the points of the screws *l*. The outer bearing bodies *h* are, therefore, mounted with the aid of slide discs *o* and *p* on the outer screw spindles *q* capable of being rotated in the nuts *q'* as a further means of adjustment. The slide disc *o* rests rigidly in a cavity in the bearing body *h*. In order that the disc *o* can participate in the swinging movements of the bearing body *h*, it rests against a flat surface of the slide disc *p* which, in turn, rests loosely with a concave surface on the convex end face of the screw spindle *q*.

The bearing frames *g*, *h* and *i*, carrying the two lower rows of supporting rolls *e* are, therefore, supported in such a manner that the two inner bearing bodies *g* can be raised or lowered in relation to the outer bearing bodies *h*.

Figure 2:
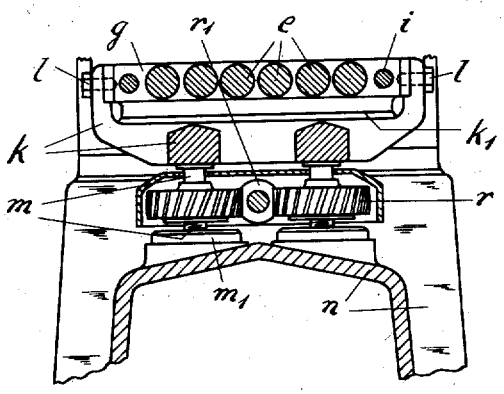
Figure 2 is a section through the adjustable supporting mechanism on line II—II of Figure 1.
Figure 3:
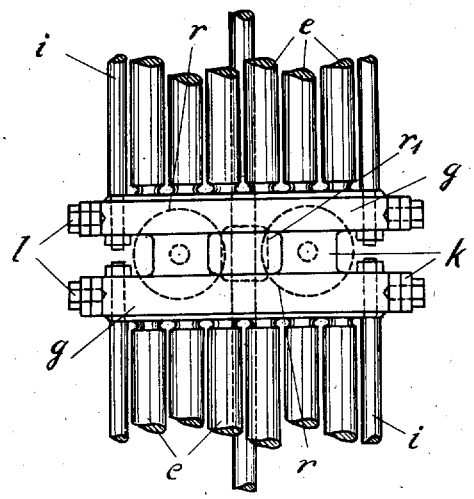
Figure 3 shows a top plan of the middle portion of the supporting mechanism.

The degree of adjustment of the supporting rolls *e* depends upon the pressure to which it is necessary to subject the sheet passing between the straightening rolls *b* and *c* for straightening the same. The lower supporting rolls *e* may be adjusted towards and/or away from the straightening rolls depending upon the particular locations at which pressure is required to be given the sheet for straightening the same. Such adjustment, necessary for the supporting rolls to obtain the straightening of the sheet, may be obtained in the following ways:

The ratio of gearing of the worm-gears *r*, *r*I (Figures 2 and 3) rotating the inner spindles *m*, when the inner spindles *m* and the outer spindles *q* have the same pitch, may differ from that of the worm-gears *s*, *s*I rotating the outer spindles *q*, which latter worm-gears are driven from the same hand-wheel shaft *t* as the worm-gears *r*, *r*I. The pitches of the inner and outer spindles *m* and *q* may also differ when the ratios of gearing of the inner and outer worm-gears *r*, *r*I and *s*, *s*I, respectively, are similar, and finally the ratios of gearing between the inner and outer-worm gears *r*, *r*I and *s*, *s*I, as also the pitches of the inner and outer spindles *m* and *q*, may differ. The ratio of gearing of the worm-gears or the pitches of the spindles must, however, always be chosen so that, according to whether the inner or outer sections of the plate have to be straightened, the middle portion of the lower straightening rolls *c* are particularly strongly deflected toward the work, or so that the work can press the straightening rolls *c* downwardly on the inner side but not on the outer side, i. e. the two lower rows of supporting rolls *e* must be capable of being adjusted, by the rotating of the shaft *t*, in the one instance, from a horizontal position to a vertically raised position and, in the other instance, to a vertically lowered position so that one end of said supporting rolls has a relative movement with respect to the other in moving into its supporting position.

These adjustments of the rows of supporting rolls *e* can, for example, be attained by providing the inner spindles *m* with a larger pitch than the outer spindles *q* when their ratio of gearing is similar. By turning the hand-wheel *u* from its zero position in which the rows of supporting rolls *e* are horizontal, in the one direction, the inner bearing bodies *g* will be raised more than the outer bearing bodies *h*, causing the two rows of supporting rolls *e* to assume a particular position for producing the desired straightening of the sheet. By turning the hand-wheel *u* once more from the zero position, but in this instance in the opposite direction, the inner bearing bodies *g* will descend more than the outer bearing bodies *h*, causing the two rows of supporting rolls *e* to assume a different position.

The pitches of the spindles *m* and *q* should be preferably selected so that the adjustment of the rows of supporting rollers *e* would, so far as possible, result in having the straightening rolls assume the necessary position for straightening the sheet passing therebetween.

By means of such a supporting mechanism, it is possible to a great extent to positively adjust the shape of the deflecting curve of the straightening rolls, to obtain quickly the necessary straightening of the work and thereby a good straightening result.

The spindles *m* and *q* are detachably coupled individually with the worm-wheels *r* and *s*, for the purpose of uniformly adjusting the supporting rolls *e* on the unloaded straightening rolls *c* when setting up the machine or inspecting same after replacing or wear of certain elements of the machine. This coupling is effected by means of a conical surface *v* on each spindle *m* and *q* and of a coupling ring *w*, secured to the worm-wheels *r* and *s* and drawn into a groove *y* therein by means of set-screws *x*, whereby the hollow conical surface of the coupling-ring *w* is pressed against the conical surface *v* of the spindles *m* and *q*. After releasing the coupling, the corresponding threaded spindle *m* or *q*, respectively, may be turned by means of a spanner in the nut *q*I and thus individually vertically adjusted.

Instead of the worm-gears *r*, *r*I and *s*, *s*I and spindles *m* and *q*, other similarly acting adjusting means, such as wedges, cams or the like, may be used.

Moreover, it is not necessary to employ supporting rollers *e* for supporting the straightening rolls *c*. The supporting of the rolls *c* may be effected by a number of straightening roll journal-bearings distributed along the length of each straightening roll *c* and arranged, according to the present invention, to perform different lengths of travel when passing into the supporting position. Such journal bearings arranged along the straightening rolls *c* can be brought into supporting position by means of a common hand-wheel shaft, so that all the straightening rolls *c* may be adjusted to the deflection curve caused by the middle load whereby the shape of this curve is positively determined during the straightening process.

While I have shown and described a specific embodiment of my invention, it will be understood that I do not wish to be limited exactly thereto, since various modifications may be made without departing from the scope of the invention as defined by the following claims.

I claim:

1. A roller leveler including a plurality of straightening rolls, suporting means for said straightening rolls comprising a plurality of supporting rollers shorter than said straightening rolls and arranged along said straightening rolls, means adapted to adjust said supporting rollers vertically to flex said straightening rolls in the curvature necessary to straighten a sheet passed between said straightening rolls, said adjusting means including mechanism to positively produce and control movement of the ends of individual supporting rollers vertically through unequal lengths of travel in passing into their supporting position to maintain said straightening rolls to the desired deflection curve required for straightening the work.

2. A sheet and plate straightening machine comprising a plurality of straightening rolls, supporting means for said straightening rolls comprising a plurality of relatively short supporting rollers arranged along said straightening rolls to flex said straightening rolls to the curvature necessary to straighten a sheet passed between said straightening rolls, said supporting rollers being coincident to each other across the transverse line of travel of the material to be straightened and means for moving the ends of said supporting rollers vertically, said means including mechanism for positively producing and controlling differential movement of the ends of individual supporting rollers to bring said straightening rolls to the desired deflection curve necessary for straightening the work and to maintain said curvature.

3. A sheet and plate straightening machine comprising a plurality of straightening rolls, supporting means for said straightening rolls comprising a plurality of supporting rollers of a length less than the length of said straightening rolls and arranged along said straightening rolls, and means for moving said supporting rollers vertically to maintain said straightening rolls deflected to the curvature necessary for straightening the work, said means including mechanism for positively producing and controlling the simultaneous movement of the adjacent ends of said supporting rollers with respect to the other ends of said supporting rollers in moving into their supporting position.

4. A sheet and plate straightening machine comprising a plurality of straightening rolls, supporting means for said straightening rolls comprising a plurality of relatively short supporting rollers arranged along the working area of each of said straightening rolls to flex said straightening rolls to the curvature necessary to straighten a sheet passed between said straightening rolls, said supporting rollers being coincident to each other across the transverse line of travel of the material to be straightened and controlled means for adjusting said supporting rollers vertically, said controlled means including a shaft, means for rotating said shaft and mechanism conecting said shaft to said supporting rollers for positively moving one end of said supporting rollers a greater distance than the other end of said supporting rollers.

FRITZ UNGERER.